United States Patent [19]

Anderton

[11] Patent Number: 4,838,640

[45] Date of Patent: Jun. 13, 1989

[54] FIBER OPTIC IN-LINE SPLICE CASE ASSEMBLY

[75] Inventor: John J. Anderton, Oil City, Pa.

[73] Assignee: GTE Products Corporation, Stamford, Conn.

[21] Appl. No.: 562,926

[22] Filed: Dec. 19, 1983

[51] Int. Cl.⁴ .................................................. G02B 7/26
[52] U.S. Cl. .................................. 350/96.20; 350/96.21
[58] Field of Search ............... 350/96.10, 96.15, 96.20, 350/96.21, 96.22

[56] References Cited

U.S. PATENT DOCUMENTS

| | | | |
|---|---|---|---|
| 4,205,897 | 6/1980 | Stankos | 350/96.21 |
| 4,257,674 | 3/1981 | Griffin et al. | 350/96.21 |
| 4,266,853 | 5/1981 | Hutchins et al. | 350/96.20 |
| 4,359,262 | 11/1982 | Dolan | 350/96.20 |
| 4,373,776 | 2/1983 | Purdy | 350/96.20 |
| 4,418,982 | 12/1983 | Williams | 350/96.20 |
| 4,556,281 | 12/1985 | Anderton | 350/96.20 |
| 4,602,845 | 7/1986 | Anderton | 350/96.20 |
| 4,666,240 | 5/1987 | Caron et al. | 350/96.20 |
| 4,679,896 | 7/1987 | Krafcik et al. | 350/96.20 |
| 4,685,764 | 8/1987 | Hoffer et al. | 350/96.20 |
| 4,754,876 | 7/1988 | Noon et al. | 350/96.20 X |

Primary Examiner—William L. Sikes
Assistant Examiner—Brian M. Healy
Attorney, Agent, or Firm—John A. Odozynski; William H. McNeill

[57] ABSTRACT

An in-line splice case assembly includes a pair of end plugs exhibiting axially disposed apertures for mating optical fibers and fiber wands associated therewith. A pair of elongated, rigid torque bars join the end plugs and support at least one, but preferably two, rotatably attached, resilient clips, the clips for securing appropriate elastomeric fiber splices. A substantially cylindrical housing encloses the end plugs, the torque bars, and the clips. The housing exhibits an interior surface having threaded portions at opposite ends thereof, complementary to threaded portions of a pair of end caps threaded thereinto.

2 Claims, 1 Drawing Sheet

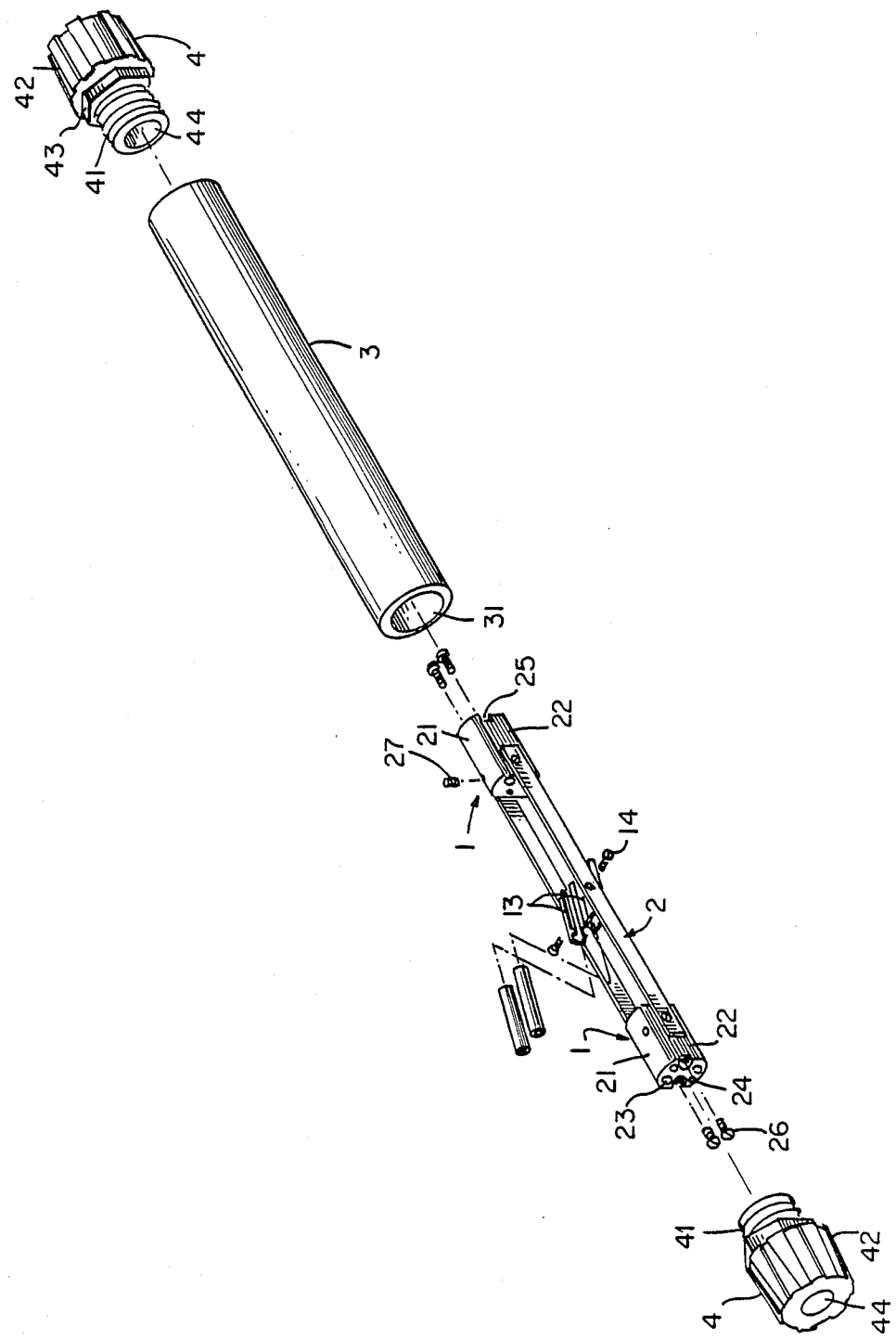

FIBER OPTIC IN-LINE SPLICE CASE ASSEMBLY

TECHNICAL FIELD

The invention relates to fiber optic communication equipment and more particularly, to apparatus for implementing the interconnection of at least two optical fibers.

BACKGROUND OF THE INVENTION

There are many advantages to transmitting light energy via optical fiber waveguides and the use thereof is diverse. Single or multiple fiber waveguides may be used simply for transmitting light to a remote location. Complex communication systems may transmit multiple specific optical signals. These devices often require the coupling of fibers in end-to-end relationship. The coupling is a source of light loss with axial misalignment representing a particularly serious problem. Other factors causing signal loss are angular misalignment of fibers, longitudinal separation of fiber ends and reflection or refraction at the fiber ends.

In response to the need to efficiently couple separate optical fibers, various approaches have evolved. U.S. Pat. No. 4,257,674, "Elastomeric Splice," to Griffin et al is directed to a splice or holder fabricated from an elastomeric material. The substantially cylindrical splice exhibits an axially aligned opening characterized by a diameter smaller than the diameter of the optical fiber. As a fiber is inserted into the opening, the walls of the splice tend to expand. Elastomeric restoring forces exerted on the fiber tend to maintain proper axial alignment. In a preferred embodiment, the axially aligned opening exhibits a triangular cross-section so that contact is made and restoring forces applied to the fiber at three points on its circular cross-section.

The elastomeric splice is emminently suited to effectuate an optical connection between pairs of fibers as might be originally comprised by opposing loose buffer tubes or other cable configurations. The loose buffer tubes generally remind of strawlike structures through which a plurality of cladded fibers are routed. In practice, the tubes may be positioned through or in abutment with the subject splice casing assembly and the fibers joined in an elastomeric splice, or pair of splices, supported within the case. The case thereby provides protection for and imparts an enhanced degree of ruggedization to the individual fibers.

DISCLOSURE OF THE INVENTION

The above and other objects, advantages and capabilities are achieved in one aspect of the invention by a splice casing assembly especially suited for, but not restricted to, optical fibers residing in loose buffer tubes.

The in-line splice case assembly includes a pair of end plugs exhibiting axially disposed apertures for mating optical fibers and fiber claddings associated therewith. A pair of elongated, rigid torque bars join the end plugs and support at least one, but preferably two, rotatably attached, resilient clips, for securing appropriate elastomeric fiber splices. A substantially cylindrical housing encloses the end plugs, the torque bars, and the clips. The housing exhibits an interior surface having threaded portions at opposite end thereof, complementary to threaded portions of a pair of end caps threaded thereinto.

BRIEF DESCRIPTION OF THE DRAWING

The drawing is an exploded view of the subject splice case assembly.

DESCRIPTION OF A PREFERRED EMBODIMENT

For an understanding of the present invention together with other and further objects, advantages and capabilities thereof, reference is made to the following disclosure and appended claims in conjunction with the above-described drawing.

Referring now to the drawing, the subject splice case assembly is seen to include a pair of somewhat elongated end plugs 1 rigidly joined by elongated, laterally extending torque bars 2. The torque bars may be attached to the end plugs by screws or equivalent fasteners as shown in the drawing.

In practice, end plugs of various configurations, depending on the particular form of optical cable encountered, will be required in order to complete the splice case assembly.

The end plugs, shown in the drawing are characterized by a pair of rounded surfaces 21 complementary to the interior of the splice case housing 3, and a pair of flat surfaces 22 to which the torque bars are fastened. The end plugs exhibit two pairs of apertures 23 and 24 extending in an axial direction the length of the end plugs. The larger diameter apertures 23 accommodate the coated glass fibers which may be surrounded by woven protective layers. In practice, the protective layers are dressed back away from the fibers, positioned in lateral cutout portions 25 and secured by a pair of tie-off screws 26. In addition, the fiber optic cable will customarily be provided with a reinforcing "wand" running the length of the cable. The wand may be comprised of a strand of steel, fiberglass, copper or other material of suitable tensile strength. The wands are to be dressed through smaller diameter apertures 24 and severed at the other side of the end plugs. A pair of fasteners 27 is provided each of the end plugs in order to secure the wands thereto. The fasteners are in the form of a pair of set screws that are threaded into threaded bores extending generally radially from the rounded surface toward the interior of the end plugs.

A pair of splice clips 13 are pivotably fastened to the torque bars via rivets 4. The clips secure elastomeric splices within the splice case and rotate or pivot so that a convenient length of fiber may be run through to the splice and excess fiber length taken up by the rotation of the splice clips 13.

Upon completion of the splice, the end plugs 1, torque bars 2, splice clips 13 and fibers are surrounded by the substantially cylindrical housing 3. The housing has threaded portions 31 at opposite ends of an interior surface. The splice case assembly is completed by a pair of end caps 4, each exhibiting a threaded portion 41 for fastening to the housing. The end caps 4 also comprise a tapered and grooved gripping portion 42 and an intermediate polygonally perimetered shim portion 43. An axial bore 44 extends the length of each of the end caps 4 and allows the insertion of an optical fiber cable.

As alluded to above, the subject splice case assembly has been described herein with reference to its anticipated use with a specifically configured cable. Use with cables of varied configurations is, of course, contemplated by the invention. However, variations in cable configurations would presumably require concomitant variations in the splice case assembly. The variations would most likely occur with respect to the end plugs and possibly the end caps.

Accordingly, while there have been shown and described what are at present considered the preferred embodiments of the invention, it will be obvious to those skilled in the art that various changes and modifications may be made therein without departing from the scope of the invention as defined by the appended claims.

INDUSTRIAL APPLICABILITY

The subject invention is useful in fiber optic communication and information delivery systems, especially in areas involving the interconnection of two or more optical fibers.

What is claimed is:

1. A fiber optic in-line splicer case assembly comprising: a pair of end plugs exhibing axial apertures for mating optic fibers and associated fiber wands, torque bars rigidly joining said end plugs, at least one resilient clip rotatably attached to one of the torque bars at a point intermediate the end plugs, said clip for securing a fiber optic splice, a substantially cylindrical housing for surrounding said end plugs, said torque bars and said clip; said housing including threaded portions at opposite ends of interior surface, and a pair of end caps, each exhibiting a threaded portion whereby the end caps are to be threaded into the opposite ends of the housing, said end plugs exhibiting surfaces complementary to an interior surface of the housing and flat surfaces to which said torque bars are attached, each of said end plugs having an axially extending aperture for a glass fiber and each of said end plugs further having a threaded bore extending from a rounded surface of the end plug toward its interior for the insertion of a fastener for the fiber wand.

2. A splice case assembly as defined in claim 1 wherein each of the end plugs comprises at least one cutout portion for positioning a protective layer for the glass fiber.

* * * * *